United States Patent
Hurwitz

(12) 
(10) Patent No.: US 6,256,669 B1
(45) Date of Patent: *Jul. 3, 2001

(54) METHOD AND APPARATUS FOR BANDWIDTH CHARACTERIZATION AND REPORTING IN WEB BROWSERS

(75) Inventor: Roger A. Hurwitz, Hillsboro, OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/977,556

(22) Filed: Nov. 25, 1997

(51) Int. Cl.[7] .................................................. G06F 11/30
(52) U.S. Cl. ............................................................. 709/224
(58) Field of Search .................................. 709/217, 218, 709/219, 232, 223, 224

(56) References Cited

U.S. PATENT DOCUMENTS

| | | | | |
|---|---|---|---|---|
| 5,951,650 | * | 9/1999 | Bell et al. | 709/238 |
| 5,953,506 | * | 9/1999 | Kalra et al. | 709/231 |
| 5,956,716 | * | 9/1999 | Kenner et al. | 707/10 |
| 6,105,064 | * | 8/2000 | Davis et al. | 709/224 |

\* cited by examiner

*Primary Examiner*—Kenneth R. Coulter
(74) *Attorney, Agent, or Firm*—Blakely, Sokoloff, Taylor & Zafman LLP

(57) ABSTRACT

A method for characterizing the bandwidth available to a user of a Web browser is disclosed. The method includes sending a request to a server requesting a transfer of a file containing data; receiving a response back from the server relating to the transfer; determining the amount of time expired between sending the request and receiving the response; receiving at least a portion of the data of the file from the server; and determining the amount of the data received within a preselected period of time.

21 Claims, 5 Drawing Sheets

METHOD AND APPARATUS FOR BANDWIDTH CHARACTERIZATION AND REPORTING IN WEB BROWSERS

BACKGROUND OF THE INVENTION

1. Field of the Invention

This invention relates generally to World Wide Web browsers and more particularly, to a method and apparatus for bandwidth characterization and reporting in Web browsers.

2. Description of the Related Art

The Internet is a network of computers and computer networks located both domestically and throughout the world. Generally, the World Wide Web ("the Web") is a collection of files available across the Internet that conform to standards designed to facilitate display, location and retrieval of information ("content") available on the Internet, typically though not necessarily, through a graphical user interface (GUI). Computer programs that read and display information stored in files in recognized formats are referred to as Web browsers. Web browsers are manufactured by a number of companies including Netscape Communications Corp. and Microsoft Corp. Although the term "server" has more than one meaning in the World Wide Web context, a "server" is a computer connected to the Internet on which Web formatted content may be stored.

There are a large number of Web standards for information storage and retrieval. Of these, Hypertext Markup Language ("HTML") is currently the most widely adopted format. Using a Web browser a user is able to retrieve and display information stored in HTML format. Such information may be stored on virtually any computer or computer network connected to the Internet and the information itself may be varied in form, i.e., text, a picture, sound, video, etc. Files or documents stored in a Web format are often referred to as "Web pages" because each file or document typically appears as a separate screen or page when viewed by a Web browser.

Within any given Web page the format of information a user can access through a Web browser is varied. For example, through a Web page a user can view text files, image (graphics) files, and moving image files and hear audio files. Some of these media resource files are specialized and require the Web browser to utilize additional programs or applications to download and display or play these files. These additional programs or applications are referred to as plug-ins or content handlers. For example, Adobe Acrobat can be used to view postscript (.pdf) files, Real Audio can be used to play audio (.ra) files, QuickTime can be used to play moving image (.qt) files, and FlashPix viewers can be used to view image (.fpx) files.

Various factors affect the bandwidth at which a specialized media resource file can be downloaded to the user's computer. First, the user can be connected to the internet in an ever increasing number of ways. Some examples of ways in which a user may connect to the internet include a telephone modem, a cable modem, an ISDN line, and a T1 line. These methods of connection can all transfer data at different bytes per second or bandwidths, thus varying greatly the speed at which a user can download information from the internet. With the advent of increasingly faster connections to the internet, the variance in bandwidth will be greater.

Moreover, such additional factors as the number of users accessing a particular server, changes in the routing of requests, caching, etc. affect the bandwidth at which a user can download information from the internet. These additional factors could be different every time a user attempts to download information. As a result, the same user can experience different bandwidths at different times while accessing data on the internet.

Further, Web browsers currently do not have the capability to determine the bandwidth available and report this information to content handlers. The present invention is directed to overcoming, or at least reducing the effects of, one or more of the problems set forth above.

SUMMARY OF THE INVENTION

In one aspect of the present invention, a method is provided for characterizing the bandwidth available to a user of a Web browser. The method includes sending a request to a server requesting a transfer of a file containing data; receiving a response back from the server relating to said transfer; determining the amount of time expired between sending the request and receiving the response; receiving at least a portion of the data of the file from the server; and determining the amount of the data received within a preselected period of time.

BRIEF DESCRIPTION OF THE DRAWINGS

Other objects and advantages of the invention will become apparent upon reading the following detailed description and upon reference to the drawings in which.

Figure 1:
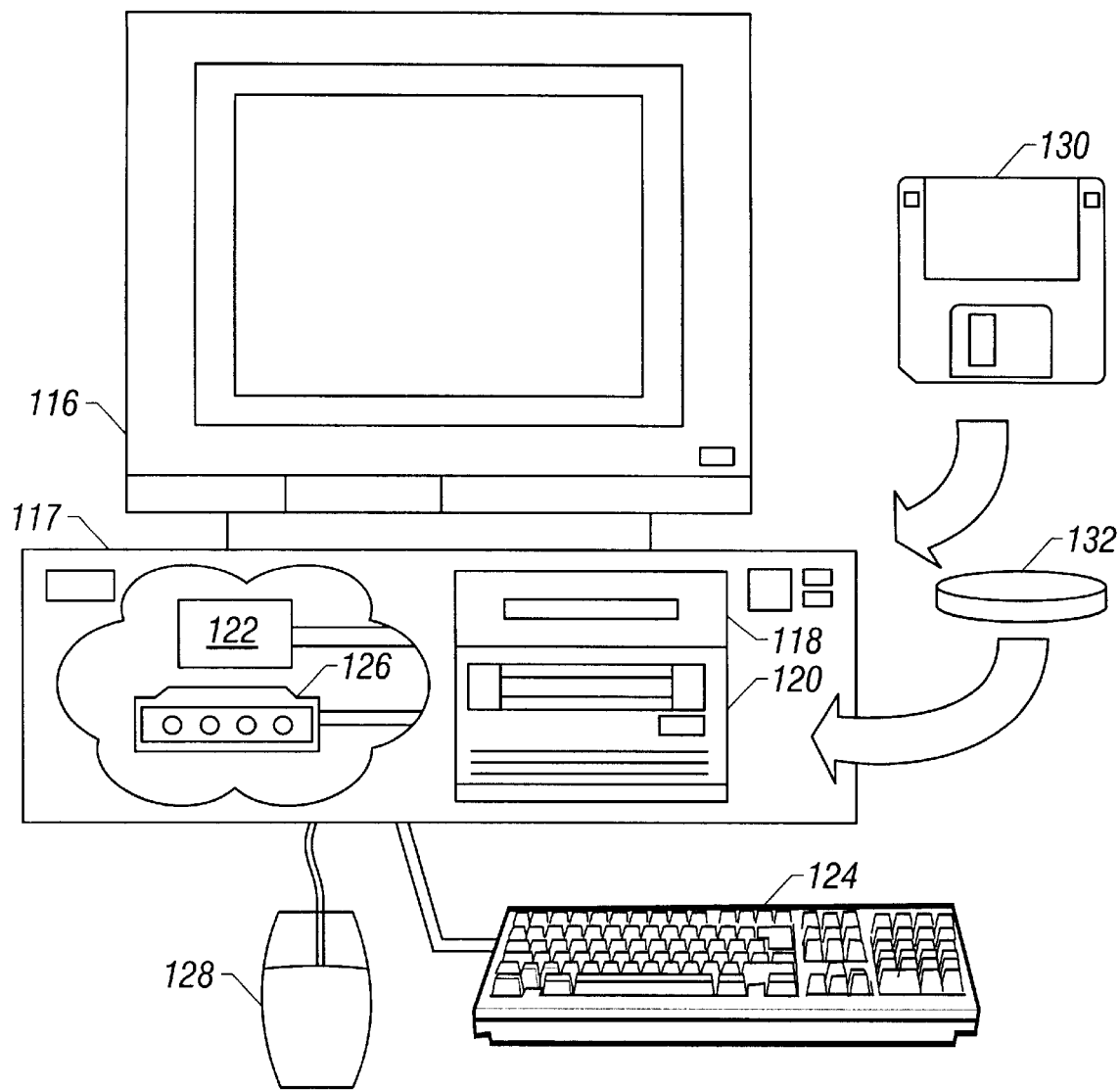
FIG. 1 is a stylized diagram of a personal computer configured for internet access.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

FIG. 1 illustrates one particular embodiment of a personal computer that may be utilized to gain access to the internet. A personal computer 117 includes a monitor 116, a floppy disk drive 118, an optical disk drive 120, and a hard disk drive 122, each of which is an individual program storage medium comprising part of the computer 117 memory subsystem. The computer 117 also includes a keyboard 124, a modem 126, and a mouse 128. The computer 117 might, in other embodiments, omit many of these components or employ still others in addition, or in lieu, of those illustrated. The components illustrated are merely exemplary of components generally considered standard for computers such as the personal computer 117. There may be many variations on this theme. For instance, the modem 126 is shown internal to computer 117, but in other embodiments may be external. Moreover, in this embodiment the computer 117 is connected to the internet via the modem 126. A variety of different connections, however, could be utilized to connect the computer 117 to the internet, such as an ISDN line, T1 line, cable modem, etc.

The computer 117 in the particular embodiment illustrated in FIG. 1 is a desktop computer. However, the invention is not so limited and is applicable to other types of personal computers, such as laptop computers and hand-held computers, and other types of computers providing access to the internet.

Some portions of the remaining detailed descriptions are presented in terms of software implemented methods and/or symbolic representations of operations on data within a computer memory. These software implemented methods and representations are the means used by those skilled in the art to most effectively convey the substance of their work to others skilled in the art. A software implemented method is here, and is generally, conceived to be a selfconsistent sequence of acts leading to a desired result. The acts require, at some level, physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

However, all of these and similar terms are to be associated with the appropriate physical quantities and are merely convenient labels applied to these quantities. Unless specifically stated or as may otherwise be apparent from the above discussions, terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 2:
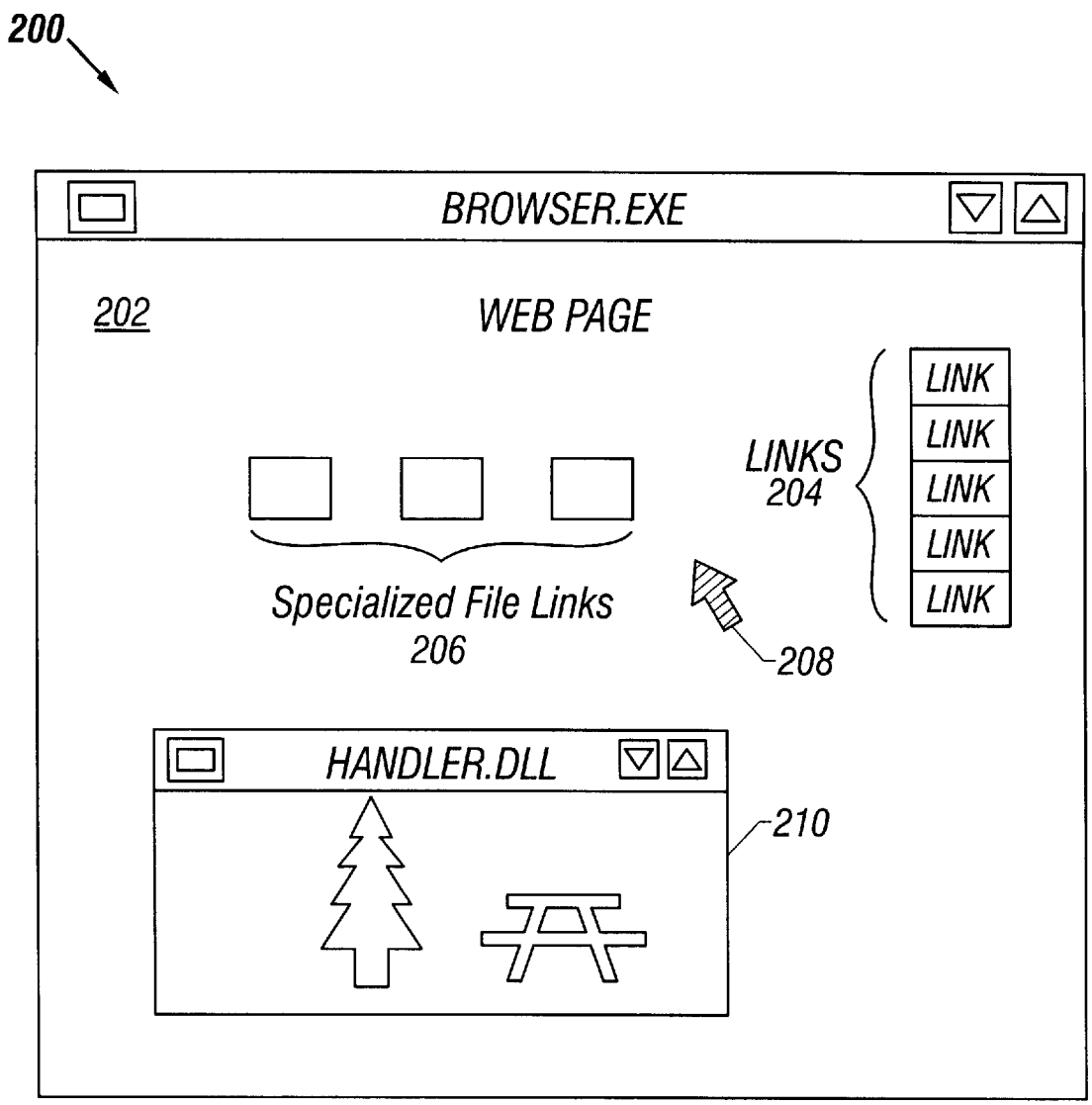
FIG. 2 is an illustration of a Web browser graphical user interface (GUI)

Referring now to FIG. 2, an exemplary Web browser GUI 200 is illustrated. A Web browser is an application program that could be stored on the hard disk drive 122 of the computer 117 or other program storage medium. An exemplary Web page 202 from the Web is shown within the Web browser GUI 200. Links 204 to other data and Web pages and specialized media resource files 206 can be selected by the user. A user can select links 204 or specialized media resource file links 206 by pointing a cursor (an arrow) 208 with the aid of the mouse 128 or other pointing device and clicking on the appropriate link or icon of the Web page 202.

When a user wishes to download a specialized media resource file from a specialized media resource file link 206, the user clicks on the icon associated with the link. The Web browser then sends a request to the server containing the file. The server can download or spool the requested file to the computer 117 in at least two ways. In one instance, the server sends an acknowledgment of the request and then begins sending the data to the computer 117. In another instance, the server simply begins sending the data to the computer 117. In the second instance, the data contains a header that describes the attributes of the file. Moreover, the data is generally sent to the computer 117 by the server in packets of data, rather than a complete stream of data.

For the spooled file to be viewed or played, the Web browser must open a content handler 210 associated with the particular media type. Once the content handler 210 is opened, the spooled data can be rendered by the content handler 210.

Figure 3A:
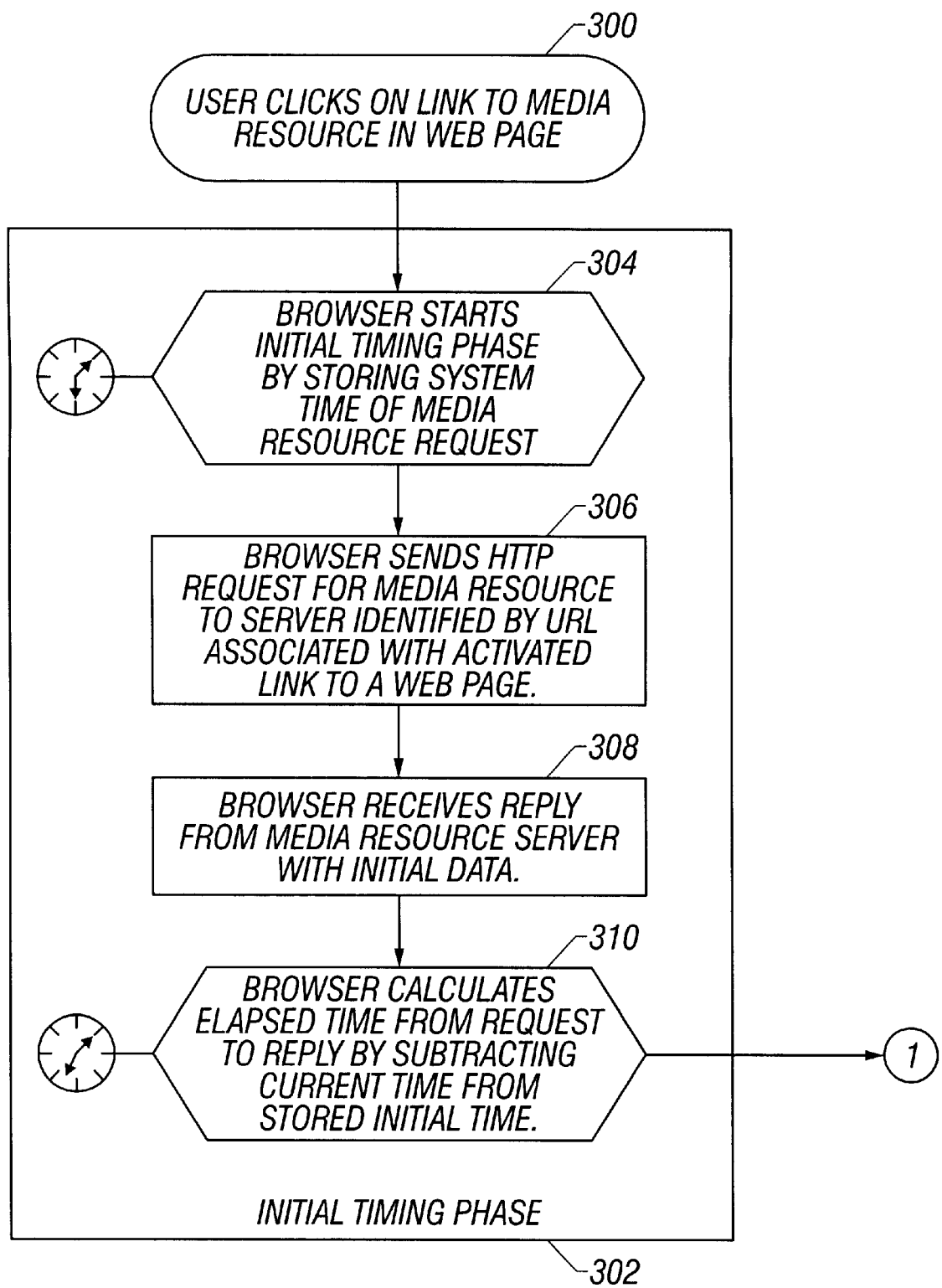
FIGS. 3A and 3B are a flow chart of one embodiment of the Initial Timing Phase and the Spooled Timing Phase.
Figure 3B:
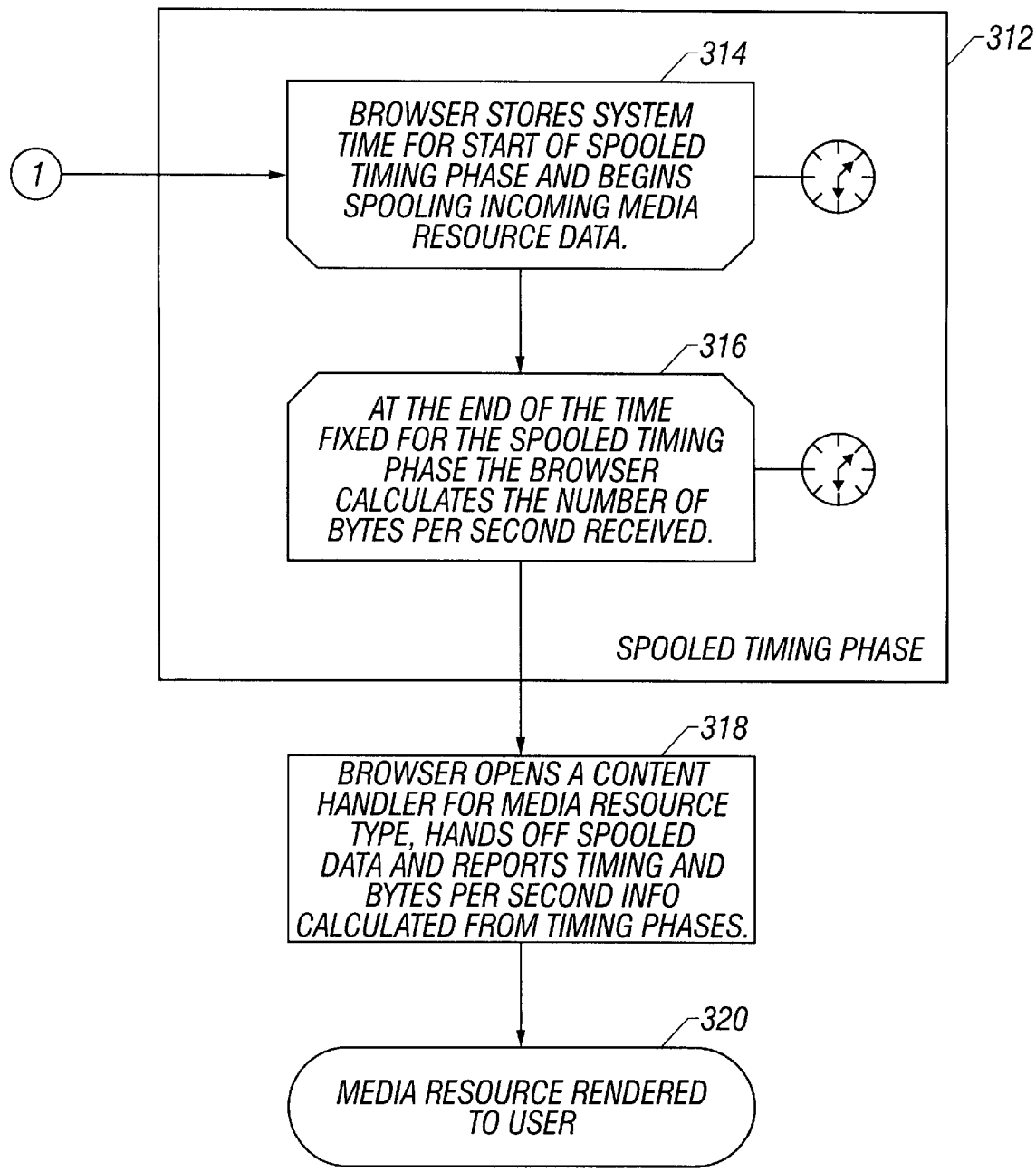

Referring now to FIGS. 3A and 3B, one exemplary embodiment of bandwidth characterization is illustrated by a flowchart. As shown by step 300, the user first clicks on a link to a media resource 206 on the Web page 202. Next, an Initial Timing Phase 302 is performed. Within the Initial Timing Phase 302 several steps are performed. The Web browser stores the system time of the media resource request based on the current time from a system timer at step 304. System timers are commonly present on modern computer systems and are accessible through standard operating system Application Programming Interface ("API") calls. APIs are the set of routines used to invoke system functions within a program. The Web browser, in step 306, sends a request for the media resource to the server associated with the activated link in the Web page.

The request sent to the server will typically be in Hypertext Transfer Protocol ("HTTP") format. HTTP is the internet protocol used to manage communication between Web browsers and servers. Further, the media resource link is associated with an appropriate server containing the media resource by a Uniform Resource Locator ("URL"). URLs identify Web resources by providing the protocols to be used, the domain name of the Web server where a resource resides, the port address to be used for communication, and the directory path to access a named Web resource.

At step 308, the Web browser receives a reply from the media resource server with initial data. The initial data could be an acknowledgment from the server that the request was received or the header at the beginning of the data depending on the method utilized by the server. Finally, the Web browser calculates the elapsed time from the sending of the request to the receipt of the reply by subtracting the current time from the stored initial time at step 310. This elapsed time is the time calculated during the Initial Timing Phase.

Following the Initial Timing Phase, a Spooled Timing Phase 312 is performed. During a first step 314 in the Spooled Timing Phase 312, the Web browser stores the system time when incoming data is first received by the Web browser from the server. In step 316, at the end of the time fixed for the Spooled Timing Phase, the Web browser calculates the number of bytes per second received. The time set for the Spooled Timing Phase 312 can be varied. The need to provide an accurate reflection of the bytes per second being downloaded must be balanced against the need to provide prompt timing information. The number of bytes per second is reported by the Spooled Timing Phase 312.

To render the spooled data the Web browser opens a content handler for the media resource type being spooled at step 318. For example, if a .fpx image file is being spooled, the Web browser would open FlashPix® from Intel Corp. Moreover, during step 318 the spooled data is transferred from the Web browser to the opened content handler. Once the spooled data is transferred to the content handler, the content handler could manage the download of data. Further, during step 318 the timing information calculated during the Initial Timing Phase 302 and the bytes per second calculated during the Spooled Timing Phase 312 are reported to the content handler. Finally, in step 320 the media resource is rendered to the user.

In one embodiment, the content handler requests the Initial Timing Phase and Spooled Timing Phase information from the Web browser. This provides for backward compatibility, because a content handler unable to utilize such bandwidth information simply does not request it. In another embodiment, the Initial Timing Phase and Spooled Timing Phase information is provided to the content handler when the initial spooled media resource data is sent by the Web browser to the content handler.

In another embodiment, the Web browser provides the content handler updated Spooled Timing Phase information during the download of data.

The information from both timing phases provides the content handler with a characterization of the bandwidth during the time information is being transferred from the server to the user. Given this information, the content handler is able to make decisions regarding the rendering of the media resource data.

Advanced Internet protocols such as HTTP 1.1 allow fine-grained control over how resources are downloaded from the server to the user through the use of techniques such as byte-range requests. A content handler making use of such advanced Internet protocols can partition a media resource file into meaningful sub-resources such as high and low quality fragments of the same representation. The content handler can then download the fragments according to need. If the content handler has information regarding the current bandwidth available it can provide a faster and more efficient download to render the media resource file to the user.

Figure 4:
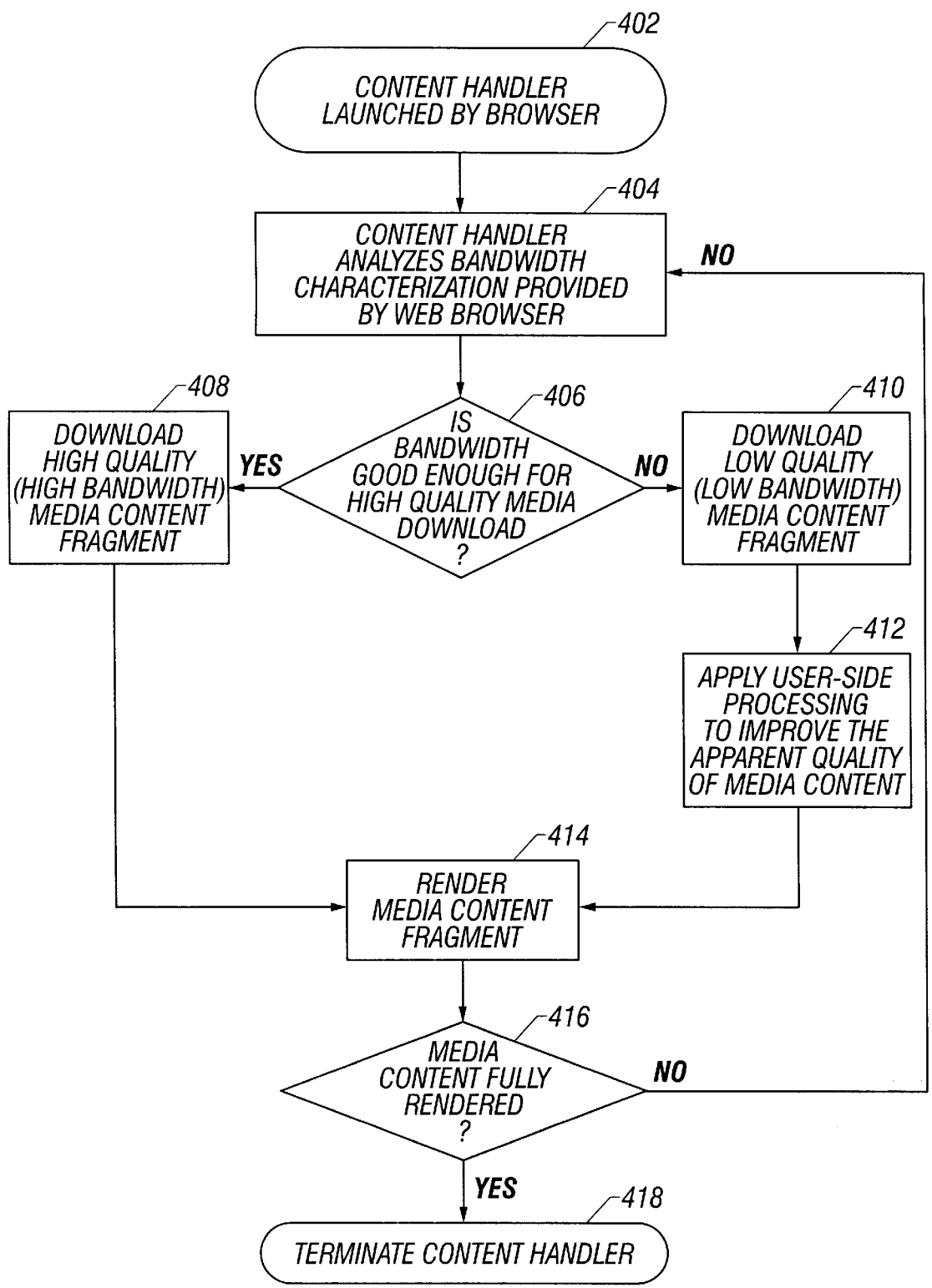
FIG. 4 is a flow chart of one embodiment of a content handler's use of the bandwidth characterization information.

Turning now to FIG. 4, a flowchart provides an example of how a content handler could use this fine-grained download capability in conjunction with bandwidth characterization information to maximize the end user experience for the prevailing bandwidth conditions. As is also shown in step 318 in FIG. 3B, in step 402 the content handler is launched. In step 404, the content handler analyzes the bandwidth characterization provided by the Web browser. Next, at step 406, the content handler must determine if the bandwidth is adequate for a high quality media download. If the content handler determines that the bandwidth is adequate for a high quality download, then, at step 408, the content handler begins downloading the high quality media content fragment from the server.

If the content handler determines that the bandwidth is not adequate for a high quality media download, then, at step 410, the content handler begins downloading the low quality media content fragment from the server. The content handler, at step 412, uses processing to improve the apparent quality of the media content.

At step 414, the media content fragment is rendered to the user. Once the media content fragment is rendered, the content handler checks to determine if the media content is fully rendered, as shown in step 416. If the media content fragment is not fully rendered, the content handler returns to step 404 and analyzes the bandwidth characterization provided by the browser. Once the media content is fully rendered, the content handler is terminated at step 418. By utilizing the bandwidth characterization information provided by the Web browser, the content handler provides the best quality media content to the user in the shortest amount of time. Additionally, the content handler continually works to fully render the media content once it is displayed.

Thus, as demonstrated above, the invention in its various embodiments addresses many problems found in the prior art. The particular embodiments disclosed above, however, are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method comprising:
    (a) identifying by a web browser on a computer a bandwidth characterization for a transfer of data from a server to the computer;
    (b) reporting the bandwidth characterization to a content handler on the computer; and
    (c) managing by the content handler the transfer of data from the server to the computer in accordance with the reported bandwidth characterization, wherein the managing comprises:
        (i) determining by the content handler a quality of data to be downloaded based on the bandwidth characterization, and
        (ii) downloading data of the determined quality from the server to the computer.

2. The method of claim 1, comprising requesting by the web browser the transfer of data from the server.

3. The method of claim 2, wherein the requesting comprises sending by the web browser to the server a request for the transfer of data; and
    wherein the identifying comprises:
        receiving by the web browser a response from the server, and
        determining the amount of time expired between sending the request and receiving the response.

4. The method of claim 3, wherein the determining the amount of time comprises:
    identifying a first time at which the request is sent to the server,
    identifying a second time at which the response is received, and
    subtracting the first time from the second time.

5. The method of claim 3, wherein the receiving the response comprises receiving an acknowledgment from the server.

6. The method of claim 3, wherein the receiving the response comprises receiving data from the server.

7. The method of claim 1, wherein the identifying comprises:
    receiving by the web browser at least a portion of the data from the server, and
    determining the amount of data received within a preselected period of time.

8. The method of claim 7, wherein the determining the amount of data comprises:
    identifying an initial time when data is received, receiving one or more blocks of data for the preselected period of time after the identified initial time, and determining the number of bytes of data received during the preselected period of time.

9. The method of claim 1, wherein the reporting comprises reporting the bandwidth characterization in response to a request from the content handler.

10. The method of claim 1, comprising rendering the transferred data by the content handler.

11. A program storage device encoded with instructions that, when executed by a computer, perform a method comprising:

(a) identifying by a web browser on the computer a bandwidth characterization for a transfer of data from a server to the computer;

(b) reporting the bandwidth characterization to a content handler on the computer; and (c) managing by the content handler the transfer of data from the server to the computer in accordance with the reported bandwidth characterization, wherein the managing comprises:

(i) determining by the content handler a quality of data to be downloaded based on the bandwidth characterization, and (ii) downloading data of the determined quality from the server to the computer.

12. The program storage device of claim 11, wherein the method comprises requesting by the web browser the transfer of data from the server.

13. The program storage device of claim 12, wherein the requesting comprises sending by the web browser to the server a request for the transfer of data; and wherein the identifying comprises:

receiving by the web browser a response from the server, and determining the amount of time expired between sending the request and receiving the response.

14. The program storage device of claim 13, wherein the determining the amount of time comprises:

identifying a first time at which the request is sent to the server, identifying a second time at which the response is received, and subtracting the first time from the second time.

15. The program storage device of claim 13, wherein the receiving the response comprises receiving an acknowledgment from the server.

16. The program storage device of claim 13, wherein the receiving the response comprises receiving data from the server.

17. The program storage device of claim 11, wherein the identifying comprises:

receiving by the web browser at least a portion of the data from the server, and determining the amount of data received within a preselected period of time.

18. The program storage device of claim 17, wherein the determining the amount of data comprises:

identifying an initial time when data is received, receiving one or more blocks of data for the preselected period of time after the identified initial time, and determining the number of bytes of data received during the preselected period of time.

19. The program storage device of claim 11, wherein the reporting comprises reporting the bandwidth characterization in response to a request from the content handler.

20. The program storage device of claim 11, wherein the method comprises rendering the transferred data by the content handler.

21. The program storage device of claim 11, wherein the program storage device comprises at least one of a floppy disk, an optical disk, a hard disk, a semiconductor device, and a magnetic tape.

* * * * *